United States Patent
Chen et al.

(10) Patent No.: US 10,193,624 B2
(45) Date of Patent: Jan. 29, 2019

(54) VISIBLE LIGHT COMMUNICATION DEVICE, METHOD AND SYSTEM

(71) Applicant: INDUSTRIAL TECHNOLOGY RESEARCH INSTITUTE, Hsinchu (TW)

(72) Inventors: Zan-Yu Chen, Taoyuan (TW); Ren-Jr Chen, Hsinchu (TW); Chung-Lien Ho, Taoyuan (TW); Wen-Chiang Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 52 days.

(21) Appl. No.: 15/390,993

(22) Filed: Dec. 27, 2016

(65) Prior Publication Data

US 2018/0159623 A1 Jun. 7, 2018

(30) Foreign Application Priority Data

Dec. 6, 2016 (TW) .............................. 105140275 A

(51) Int. Cl.
   *H04B 10/116* (2013.01)
   *H04B 10/114* (2013.01)
   *H04Q 11/00* (2006.01)

(52) U.S. Cl.
   CPC ......... *H04B 10/116* (2013.01); *H04B 10/114* (2013.01); *H04Q 11/00* (2013.01);
   (Continued)

(58) Field of Classification Search
   CPC .................................................. H04B 10/116
   See application file for complete search history.

(56) References Cited

U.S. PATENT DOCUMENTS

| 5,212,577 A * | 5/1993 | Nakamura ............. H04B 10/50 398/42 |
| 7,088,782 B2 * | 8/2006 | Mody ................... H04L 1/0618 375/260 |

(Continued)

FOREIGN PATENT DOCUMENTS

| CN | 1578485 A | 2/2005 |
| WO | WO 2011/146520 A2 | 11/2011 |

OTHER PUBLICATIONS

British Standard, "Equipment for General Lighting Purposes—EMC Immunity Requirements," BS EN 61547:1996, IEC 61547:1995, Jun. 26, 2006, pp. 1-12 (19 pages total).

(Continued)

*Primary Examiner* — Kenneth N Vanderpuye
*Assistant Examiner* — Jai M Lee
(74) *Attorney, Agent, or Firm* — Birch, Stewart, Kolasch & Birch, LLP

(57) ABSTRACT

A visible light communication method performs visible light communication by using a visible light source. In searching a central frequency of the visible light source, a plurality of central-frequency training packets are sent, the central-frequency training packets including a plurality of central-frequency candidates, and one among the plurality of central-frequency candidates is selected as the central frequency of the visible light source based on a first decoding result on the plurality of central-frequency training packets. In searching a bandwidth of the visible light source, a plurality of bandwidth training packets are sent, the bandwidth training packets including a plurality of bandwidth candidates and the central frequency of the visible light source, and one among the plurality of bandwidth candidates is selected as the bandwidth of the visible light source based on a second (Continued)

decoding result on the plurality of bandwidth training packets.

14 Claims, 12 Drawing Sheets

(52) U.S. Cl.
CPC ...... *H04Q 11/0062* (2013.01); *H04B 10/1143* (2013.01); *H04Q 2011/0086* (2013.01)

(56) References Cited

U.S. PATENT DOCUMENTS

| | | | |
|---|---|---|---|
| 7,109,466 B2* | 9/2006 | Park | H04B 10/6931 |
| | | | 250/214 A |
| 8,005,366 B2* | 8/2011 | Shin | H04B 10/116 |
| | | | 398/129 |
| 8,363,630 B2 | 1/2013 | Gong | |
| 8,538,469 B2 | 9/2013 | Wilhelmsson et al. | |
| 8,855,496 B2* | 10/2014 | Rajagopal, Sr. | H04B 10/116 |
| | | | 398/128 |
| 8,964,581 B2 | 2/2015 | Takara et al. | |
| 9,037,001 B2* | 5/2015 | Jovicic | H04B 10/1141 |
| | | | 398/172 |
| 9,088,361 B2 | 7/2015 | Castor et al. | |
| 9,161,250 B2 | 10/2015 | Gilbert et al. | |
| 9,166,683 B2 | 10/2015 | Jovicic et al. | |
| 9,246,585 B2* | 1/2016 | Yokoi | H04B 10/116 |
| 9,276,676 B2* | 3/2016 | Yokoi | H04B 10/116 |
| 9,363,698 B2 | 6/2016 | Cirillo | |
| 2007/0092256 A1* | 4/2007 | Nozue | H04J 14/0282 |
| | | | 398/72 |
| 2008/0130519 A1* | 6/2008 | Bahl | H04L 43/00 |
| | | | 370/254 |
| 2009/0180780 A1* | 7/2009 | Ann | H04B 10/1149 |
| | | | 398/128 |
| 2009/0204722 A1* | 8/2009 | Ehlers | H04L 12/4633 |
| | | | 709/236 |
| 2010/0284697 A1* | 11/2010 | Bae | H04B 10/116 |
| | | | 398/130 |
| 2011/0122937 A1 | 5/2011 | Kuipers et al. | |
| 2011/0195712 A1 | 8/2011 | Mucke et al. | |
| 2011/0200338 A1* | 8/2011 | Yokoi | H04B 10/1149 |
| | | | 398/158 |
| 2011/0229147 A1 | 9/2011 | Yokoi | |
| 2011/0286750 A1* | 11/2011 | Chang | H04B 10/116 |
| | | | 398/130 |
| 2012/0189017 A1* | 7/2012 | Davis | H04B 10/1129 |
| | | | 370/401 |
| 2012/0275796 A1* | 11/2012 | Yokoi | H04B 10/116 |
| | | | 398/130 |
| 2014/0186052 A1 | 7/2014 | Oshima et al. | |
| 2014/0270796 A1 | 9/2014 | Jovicic et al. | |
| 2014/0375217 A1* | 12/2014 | Feri | H05B 37/0272 |
| | | | 315/151 |
| 2015/0036645 A1 | 2/2015 | Shin et al. | |
| 2015/0341138 A1* | 11/2015 | Ishihara | H04B 10/25133 |
| | | | 398/35 |
| 2016/0164603 A1 | 6/2016 | De Bruijn et al. | |
| 2017/0070296 A1* | 3/2017 | Okamoto | H04L 27/3483 |

OTHER PUBLICATIONS

Electromagnetic Testing Services Ltd., "Generic Emissions and Immunity Standards for Industrial Environment EN61000-6-4:2007 & 61000-6-2:2005." Emissions EN61000-6-4:2007 (DOW Jan. 12, 2009), Immunity EN 61000-6-2:2005 (DOW Jan. 12, 2009), issued Jul. 2010.

Ferreira et al., "High Bandwidth GaN-Baased Micro-LEDs for Mulli-Gb/s Visible Light Communications." IEEE Photonics Technology Letters, vol. 28, No. 19, Oct. 1, 2016, pp. 2023-2026.

Garcia et al., "Dimming of High-Brightness LEDs by Means of Luminous Flux Thermal Estimation." IEEE Transactions on Power Electronics, vol. 24. No. 4, Apr. 2009 (First Published Feb. 18, 2009), pp. 1107-1114.

Gonzàlez et al., "Adaptive WHTS-Assisted SDMA-OFDM Scheme for Fair Resource Allocation in Multi-User Visible Light Communications," J. Opt. Commun. Netw., vol. 8, No. 6, Jun. 2016, pp. 427-440.

Haigh et al., "A 1-Mb/s Visible Light Communications Link With Low Bandwidth Organic Components," IEEE Photonics Technology Letters, vol. 26, No. 13, Jul. 1, 2014 (published May 1, 2014), pp. 1295-1298.

Haigh et al., "Visible Light Communications: 170 Mb/s Using an Artificial Neural Network Equalizer in a Low Bandwidth White Light Configuration," Journal of Lightwave Technology, vol. 32, No. 9, May 1, 2014(published Mar. 31, 2014), pp. 1807-1813.

International Standard, "Double-Capped Fluorescent Lamps—Saftey Specification," CEI IEC 61195 Second Edition, Oct. 1999, with English translation, pp. 1-9.

International Standard, "Lamp Caps and Holders Together with Gauges for the Control of Interchangeability and Saftey—Part 1: Lamp Caps,"CEI IEC 60061-1, Edition 3.35, Jan. 2005, with English translation. pp. 1-4, 6-9.

International Standard, "Lamp Controlgear—Part 2-13: Particular Requirements for D.C. or A.C. Supplied Electronic Controlgear for LED Modules," IEC 61347-2-13, Edition 2.0, Sep. 2014, with English translation, pp. 1-6, 26-32.

International Standard, "LED Modules for General Lighting—Safety Specification," IEC 62031, Edition 1.0, Jan. 2008, with English translation, pp. 1-6, 18-22.

International Standard, "Luminaires—Part 1: General Requirements and Tests," IEC 60598-1, Edition 8.0, May 2014, with English translation, pp. 1-15 (32 pages total).

International Standard, "Luminaires—Part 2: Particular Requirements—Section 4: Portable General Purpose Luminaires," IEC 60598-2-4, Second Edition, Apr. 1997, with English translation, pp. 1-7.

International Standard, "Luminaires—Part 2-2: Particular Requirements—Recessed Luminaires," IEC 60598-2-2, Edition 3.0, Nov. 2011, with English translation, pp. 1-5, 10-13.

International Standard, "Miscellaneous Lampholders—Part 2-2: Particular Requirements—Connectors for LED-Modules," IEC 60838-2-2, Edition 1.1, Apr. 2012, with English translation, pp. 1-5, 10-13.

International Standard, "Photobiological Safety of Lamps and Lamp Systems—Part 2: Guidance on Manufacturing Requirements Relating to Non-Laser Optical Radiation Safety," IEC/TR 62471-2 Technical Report, Edition 1.0, Aug. 2009, pp. 1-7.

International Standard, "Self-Ballasted LED-Lamps for General Lighting Services by Voltage > 50 V—Safety Specifications," IEC 62560, Consolidated Version, Edition 1.1, Apr. 2015, with English translation, pp. 1-8, 34-40 (31 pages total).

Kahn et al., "Wireless Infrared Communications," Proceedings of the IEEE, vol. 85, No. 2, Feb. 1997, pp. 265-298.

Li et al., "High Bandwidth Visible Light Communications Based on a Post-Equalization Circuit," IEEE Photonics Technology Letters, vol. 26, No. 2, Jan. 15, 2014, pp. 119-122.

Li, "Measurement and Test Report for Inventronics (Hangzhou) Co., Ltd.," Model EUC-050S110SC-xxxx, Report No. RSZ10051953-1&2, Prepared by Bay Area Compliance Laboratory Corp. (Shenzhen), Jun. 21, 2010, pp. 1-53.

Thai et al., "127.5 kbps Transmission Using OLED with 7 kHz 3dB Modulation Bandwidth in Visible Light Communication System," International Conference on Advanced Technologies for Communications (ATC), 2015, pp. 389-393.

* cited by examiner

VISIBLE LIGHT COMMUNICATION DEVICE, METHOD AND SYSTEM

This application claims the benefit of Taiwan application Serial No. 105140275, filed Dec. 6, 2016, the disclosure of which is incorporated by reference herein in its entirety.

TECHNICAL FIELD

The technical field generally relates to a visible light communication device, method and system.

BACKGROUND

Visible light communication (VLC) is a wireless communication technology which uses a visible light source to emit high frequency visible light signal for signal transmission. The frequency for the visible light is between 400 THz (having a wavelength of 780 nm) to 800 THz (having a wavelength of 375 nm). When a general fluorescent lamp is used as the light source, the transmission capacity is about 10 Kbit/s. When an LED (light emitting diode) is used as the light source, the transmission capacity is about 500 Mbit/s. Besides, the transmission distance may be up to 1 or 2 kilometers.

The VLC technology suitable for in indoor/outdoor positioning, hospital equipment or office communication safety etc. Besides, the VLC technology has high security issue because only when the receiver is close enough to the transmitter for receiving the visible light signal from the transmitter, the communication is allowed. The VLC technology has another issue in that the VLC is not interfered by the radio frequency signals.

However, as for the VLC technology, before communication, both the receiver and the transmitter do not know the central frequency and the usable bandwidth of the visible light source. That is because there are many types for the visible light sources which may have different central frequency and usable bandwidth.

FIG. 1A to FIG. 1D show measurements of the central frequency and usable bandwidth of four types of fluorescent lamp. The usable bandwidth in FIG. 1A to FIG. 1D is 10 MHz, 9 MHz, 2 MHZ and 5 MHz, respectively; and the central frequency in FIG. 1A to FIG. 1D is 7 MHz, 7.5 MHz, 9 MHZ and 9 MHz, respectively. Thus, even the common fluorescent lamp is used as the visible light source for VLC, the difference between the usable bandwidth of different common fluorescent lamps may be large. Further, as shown in FIG. 1A to FIG. 1D, the central frequency of the different fluorescent lamps is also different.

Thus, how to find the central frequency and the usable bandwidth of the visible light source in VLC quickly and accurately is an important issue.

SUMMARY

According to one embodiment, provided is a visible light communication (VLC) device for performing VLC by a visible light source. The VLC device includes: a processing circuit; and a current driving circuit, coupled to the processing circuit and the visible light source, the current driving circuit being controlled by the processing circuit to drive the visible light source. In searching a central frequency of the visible light source, the processing circuit is configured to: send a plurality of central frequency training packets to the current driving circuit, the central frequency training packets including a plurality of candidate central frequencies, and based on a first decoding result on the central frequency training packets, select one among the candidate central frequencies to set as the central frequency of the visible light source. In searching a bandwidth of the visible light source, the processing circuit is configured to: send a plurality of bandwidth training packets to the current driving circuit, the bandwidth training packets including the central frequency of the visible light source and a plurality of candidate bandwidth; and based on a second decoding result on the bandwidth training packets, select one among the candidate bandwidth to set as the bandwidth of the visible light source.

According to another embodiment, provided is a visible light communication (VLC) method for performing VLC by a visible light source. The VLC method includes: in searching a central frequency of the visible light source: sending a plurality of central frequency training packets, the central frequency training packets including a plurality of candidate central frequencies; and based on a first decoding result on the central frequency training packets, selecting one among the candidate central frequencies to set as the central frequency of the visible light source; and in searching a bandwidth of the visible light source: sending a plurality of bandwidth training packets, the bandwidth training packets including the central frequency of the visible light source and a plurality of candidate bandwidth; and based on a second decoding result on the bandwidth training packets, selecting one among the candidate bandwidth to set as the bandwidth of the visible light source.

According to an alternative embodiment, provided is a visible light communication (VLC) system including: a first VLC device; and a second VLC device, VLC between the first and the second VLC device being using a visible light source. In searching a central frequency of the visible light source, the first VLC device sends a plurality of central frequency training packets to the second VLC device, the central frequency training packets including a plurality of candidate central frequencies; and based on a first decoding result on the central frequency training packets from the second VLC device, the first VLC device selects one among the candidate central frequencies to set as the central frequency of the visible light source. In searching a bandwidth of the visible light source, the first VLC device sends a plurality of bandwidth training packets to the second VLC device, the bandwidth training packets including the central frequency of the visible light source and a plurality of candidate bandwidth; and based on a second decoding result on the bandwidth training packets from the second VLC device, the first VLC device selects one among the candidate bandwidth to set as the bandwidth of the visible light source.

The foregoing will become better understood from a careful reading of a detailed description provided herein below with appropriate reference to the accompanying drawings.

Figure 1A:
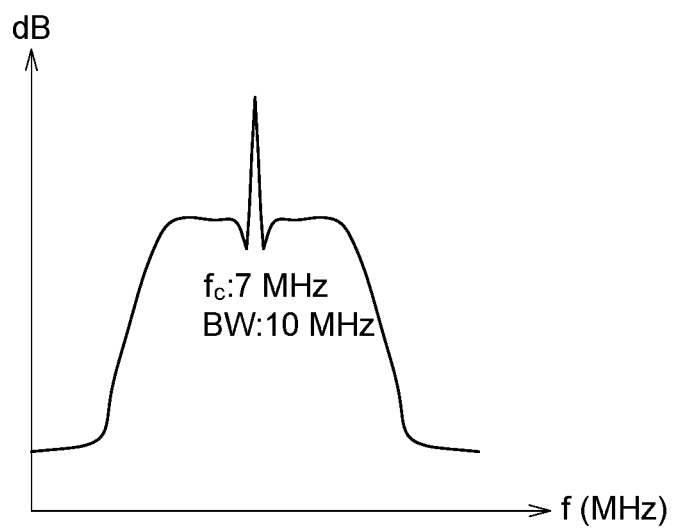
FIG. 1A to FIG. 1D show measurements of the central frequency and usable bandwidth of four types of fluorescent lamp.
Figure 1B:
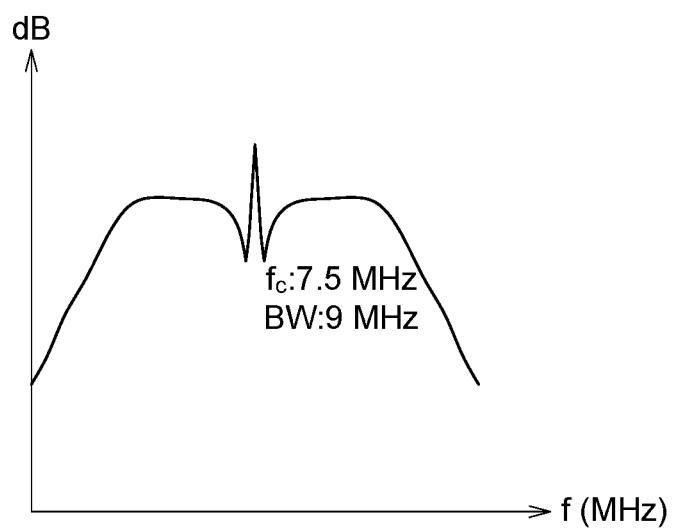
Figure 1C:
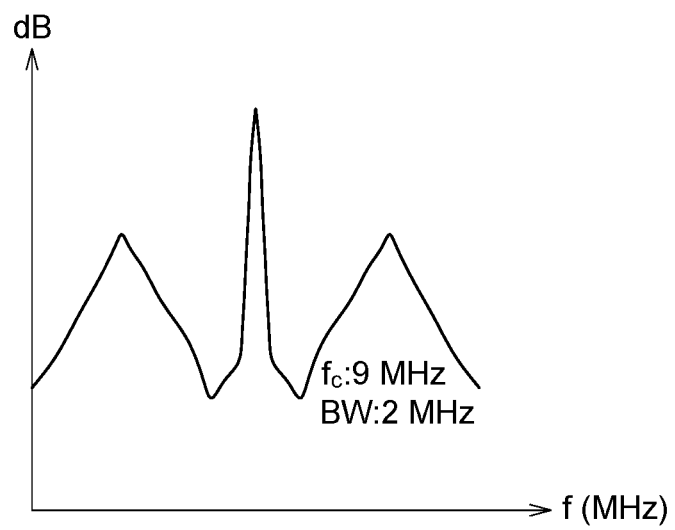
Figure 1D:
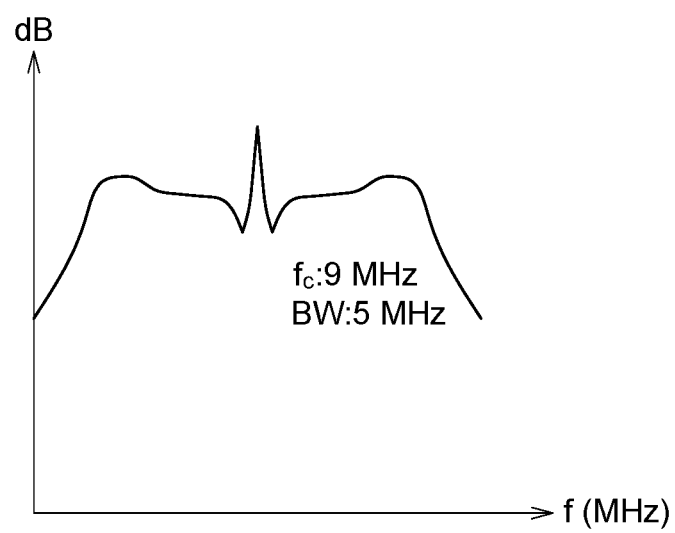

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field related to the disclosure. If the disclosure describes or explains one or some terms, definition of the terms are based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
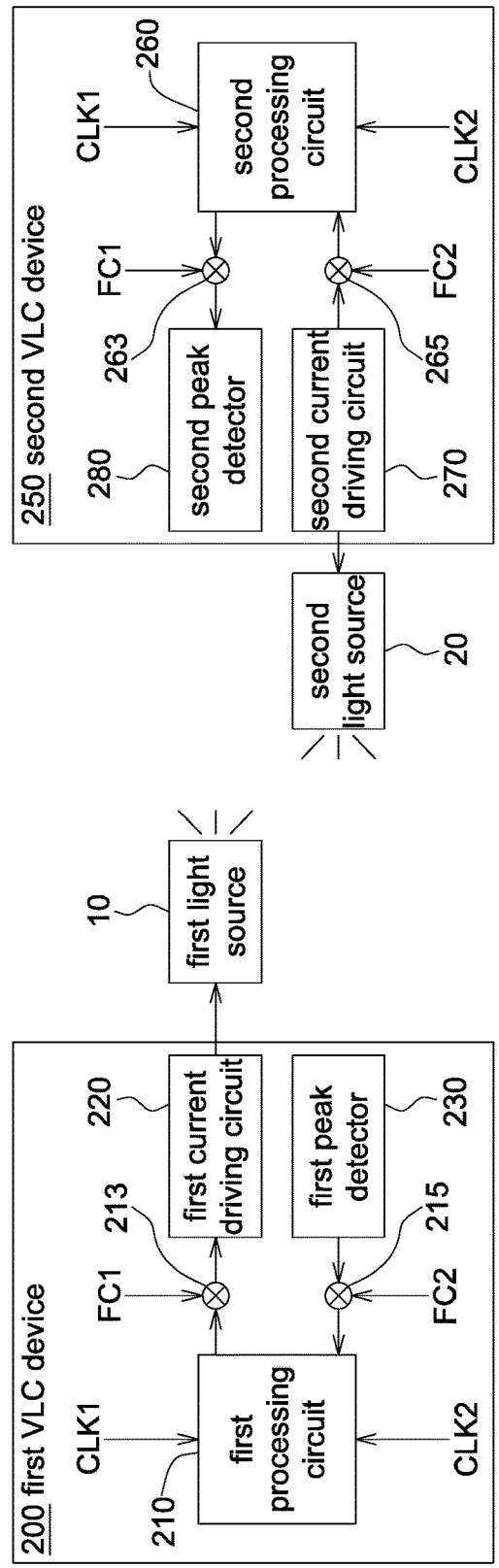
FIG. 2 shows a functional block diagram of a visible light communication (VLC) device according to an embodiment of the application.

FIG. 2 shows a functional block diagram of a visible light communication (VLC) device according to an embodiment of the application. As shown in FIG. 2, the first VLC device 200 includes a first processing circuit 210, a first current driving circuit 220, a first peak detector 230, frequency tuners 213 and 215. Similarly, the second VLC device 250 includes a second processing circuit 260, a second current driving circuit 270, a second peak detector 280, frequency tuners 263 and 265. In embodiments of the application, the VLC device may be for example but not limited by, lamps or electronic devices (mobile phones or computers) having VLC functions. For simplicity, the communication direction in which the first VLC device 200 is the transmitter and the second VLC device 250 is the receiver is referred as the downlink direction. On the contrary, the communication direction in which the second VLC device 250 is the transmitter and the first VLC device 200 is the receiver is referred as the uplink direction. The following description is taken communication in the downlink direction as the example while the communication in the uplink direction is similar.

The first processing circuit 210 is for processing the main operations of the first VLC device 200, for example but not limited by, the central frequency search operations and the usable bandwidth search operations. The details of the main operations of the first processing circuit 210 will be described later.

The first current driving circuit 220 is for driving the first light source 10 based on the current signals or the packets form the first processing circuit 210 or from the frequency tuner 213. The first light source 10 may be a visible light source.

The first peak detector 230 is for detecting a VLC signal sent from the second VLC device 250 and returns the detection result to the first processing circuit 210.

When the first VLC device 200 performs downlink VLC to the second VLC device 250, the frequency tuner 213 adds the central frequency FC1 to the VLC signals from the first processing circuit 210 and then sends to the first current driving circuit 220. That is, the frequency tuner 213 performs frequency shift on the VLC signals. The added central frequency FC1 is the central frequency of the VLC signals. In the embodiment of the application, the central frequency of the first light source 10 is found and the central frequency FC1 is set based on the central frequency of the first light source 10.

Similarly, when the first VLC device 200 receives the uplink VLC signals from the second VLC device 250, the frequency tuner 215 adds the central frequency FC2 to the VLC signals from the first peak detector 230.

Further, in VLC, the clock signal CLK1 is introduced as the bandwidth into the VLC signals. In the embodiment of the application, the usable bandwidth of the first light source 10 is found and the clock signal CLK1 is set based on the usable bandwidth of the first light source 10.

Similarly, the second processing circuit 260, the second current driving circuit 270, the second peak detector 280 and the frequency tuners 263 and 265 of the second VLC device 250 have similar functions and operations with the first processing circuit 210, the first current driving circuit 220, the first peak detector 230 and the frequency tuners 213 and 215 of the first VLC device 200.

In the embodiment of the application, when the first VLC device 200 tries to perform VLC with the second VLC device 250, the first VLC device 200 informs the second VLC device 250 about the central frequency and the usable bandwidth of the first light source 10 which are found by the first VLC device 200. Based on the central frequency and the usable bandwidth of the first light source 10, the second VLC device 250 sets the central frequency FC1 and the clock signal CLK1 of the second VLC device 250.

Besides, in performing uplink VLC, in the embodiment of the application, the second VLC device 250 finds the central frequency and the usable bandwidth of the second light source 20. The second VLC device 250 informs the first VLC device 200 about the found central frequency and the usable bandwidth of the second light source 20. Based on the central frequency and the usable bandwidth of the second light source 20, the first VLC device 200 sets the central frequency FC2 and the clock signal CLK2 of the first VLC device 200.

The adjustment of the usable bandwidth may be achieved by adjusting the clock signals, or by OFDM (orthogonal frequency division multiplexing) or other similar communication implementations. The details of adjustment of the usable bandwidth are omitted here.

In FIG. 2, the frequency tuners and the clock generators (for generating the clock signals CLK1 and CLK2) are independent of the processing circuits 210 and 260. However, in other possible embodiment of the application, the frequency tuners and the clock generators may be embedded into the processing circuits 210 and 260, which is still within the spirit and the scope of the application. Further, in other possible embodiment of the application, the frequency tuners and the clock generators may be analog or digital.

How to search the central frequency and the usable bandwidth of the light source will be described later. Before VLC, neither the first nor the second VLC devices 200 and 250 know the central frequency and the usable bandwidth of the lights sources 10 and 20.

Figure 3:
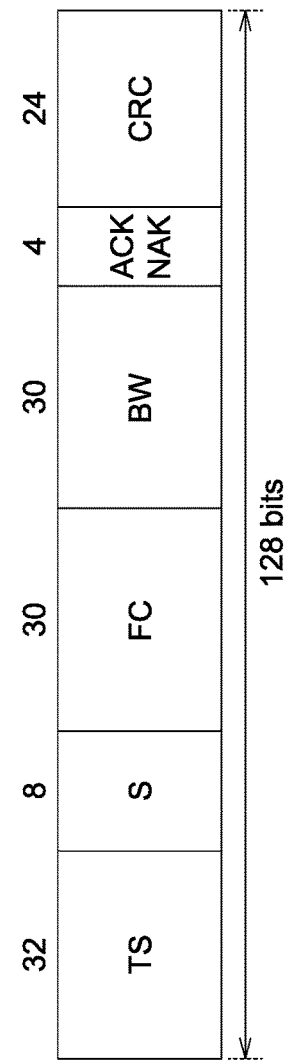
FIG. 3 shows an example of a training packet according to an embodiment of the application.

FIG. 3 shows an example of a training packet according to an embodiment of the application. The training packet may be used in searching the central frequency and the usable bandwidth. How to search the central frequency and the usable bandwidth of the light source is described later.

As shown in FIG. 3, the training packet is for example but not limited by 128 bits. The training packet includes 6 fields: TS, S, FC, BW, ACK and CRC. The TS (training sequence) field includes 32 bits for defining whether the packet is used for training. The S (state) field includes 8 bits for defining the states of the operations (either the central frequency search operation or the usable bandwidth search operation). The FC (central frequency) field includes 30 bits for defining the central frequency. The BW (usable bandwidth) field includes 30 bits for defining the bandwidth. The ACK (acknowledgement) field includes 4 bits for acknowledging whether the packet decoding is successful or not (ACK referring to success while NACK referring to fail). The CRC (error correction code) field includes 24 bits for defining the CRC codes of this training packet.

Figure 4:
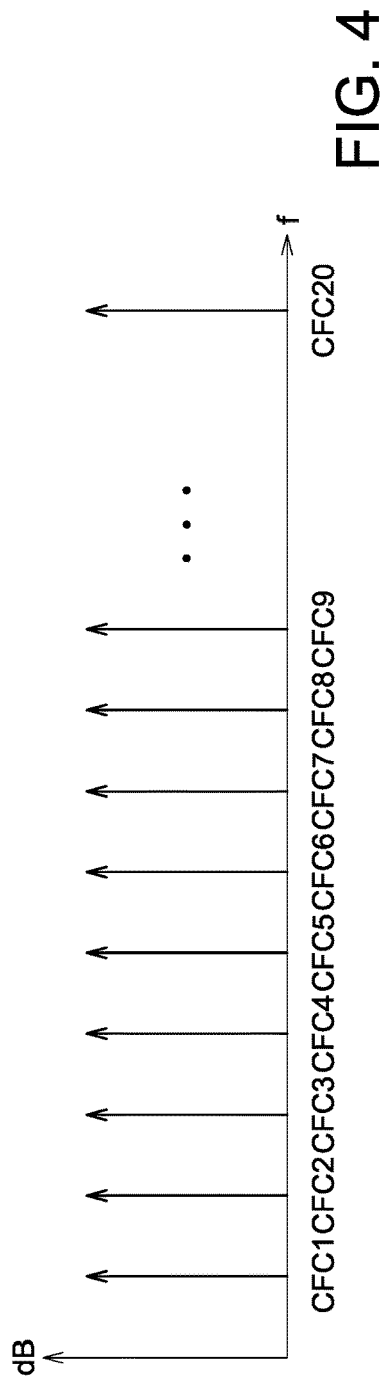
FIG. 4 shows a plurality of candidate central frequencies according to an embodiment of the application.

FIG. 4 shows a plurality of candidate central frequencies according to an embodiment of the application. For explanation, the 20 candidate central frequencies CFC1-CFC20 are distributed in 200 MHz. The candidate central frequency CFC1 is 10 MHZ, the candidate central frequency CFC2 is 20 MHZ . . . and the candidate central frequency CFC20 is 200 MHZ. The application is not limited by this. In the following, the candidate central frequencies CFC1-CFC20 may be also referred as coarse candidate central frequencies CFC1-CFC20. In training (in the central frequency searching operation), the first VLC device 200 and the second VLC device 250 will define the candidate central frequencies in advance.

Figure 5:
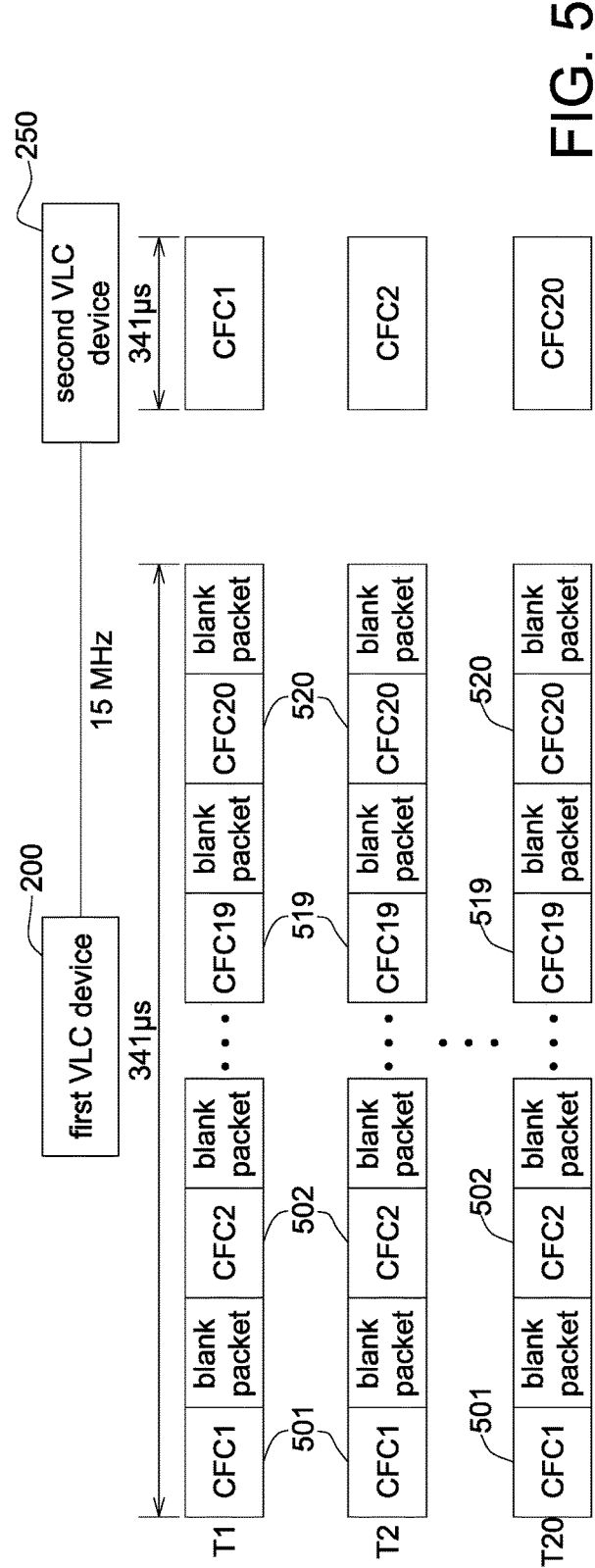
FIG. 5 shows a flow of performing a coarse central frequency search operation according to an embodiment of the application.

FIG. 5 shows a flow of performing a coarse central frequency search operation according to an embodiment of the application. In the following, the operations of searching the central frequency and the usable bandwidth of the first light source 10 are explained. How to search the central frequency and the usable bandwidth of the second light source 20 is similar and thus is omitted.

Referring to FIG. 5, the central frequency of the light source is searched first. After the central frequency of the light source is searched, the usable bandwidth of the light source is searched then.

Referring to FIG. 5, in searching the central frequency of the first light source 10, the first VLC device 200 sends 20 training packets 501-520 and 20 blank packets to the first current driving circuit 220. Each of the training packets 501-520 is followed by one of the 20 blank packets or said, each of the 20 blank packets is inserted between two of the training packets 501-520. The training packets which are used in searching the central frequency may be also referred as the central frequency training packets. The first current driving circuit 220 drives the first light source 10 based on the received training packets.

The number of the training packets depends on the number of the coarse candidate central frequencies. For example, if the number of the coarse candidate central frequencies is 20, then 20 training packets and 20 blank packets are sent. The blank packet is for adding buffer to the receiver (i.e. the second VLC device 250) for more accurately processing the received packets.

The training packet 501 indicates that this packet 501 carries information about the candidate central frequency CFC1 and the default usable bandwidth (for example, 15 MHz). In other words, the FC field and the BW field of the training packet 501 carries information about the candidate central frequency CFC1 and the default usable bandwidth. The training packets 502-520 are similar.

In details, when the first VLC device 200 sends the training packet 501, the candidate central frequency CFC1 (10 MHz) and 15 MHz are as the central frequency and the usable bandwidth of the first VLC device 200. Similarly, when the first VLC device 200 sends the training packet 502, the candidate central frequency CFC2 (20 MHz) and 15 MHz are as the central frequency and the usable bandwidth of the first VLC device 200.

For example, in the fields of the training packet 501, "000001" refers to the candidate central frequency CFC1 (10 MHz) and "000011" refers to the candidate central frequency CFC2 (20 MHz), and so on.

At the timing T1, the first VLC device 200 sequentially sends the training packet 501, the (first) blank packet, the training packet 502, the (second) blank packet, . . . , the training packet 519, the (nineteenth) blank packet, the training packet 520 and the (twentieth) blank packet; and the second VLC device 250 receives and decodes at the candidate central frequency CFC1 (10 MHz) and the default bandwidth (15 MHz).

At the timing T2, the first VLC device 200 sequentially sends the training packet 501, the (first) blank packet, the training packet 502, the (second) blank packet, . . . , the training packet 519, the (nineteenth) blank packet, the training packet 520 and the (twentieth) blank packet; and the second VLC device 250 receives and decodes at the candidate central frequency CFC2 (20 MHz) and the default bandwidth (15 MHz).

Similarly, at the timing T20, the first VLC device 200 sequentially sends the training packet 501, the (first) blank packet, the training packet 502, the (second) blank packet, . . . , the training packet 519, the (nineteenth) blank packet, the training packet 520 and the (twentieth) blank packet; and the second VLC device 250 receives and decodes at the candidate central frequency CFC20 (200 MHz) and the default bandwidth (15 MHz).

In decoding, if the central frequency of the receiver (i.e. the second VLC device 250) is close to or the same as the central frequency of the visible light source, then the decoding is successful, and vice versa.

After decoding, if the second VLC device 200 is capable of successfully decoding the corresponding training packet by the corresponding one of the candidate central frequencies CFC1-CFC20, this means the corresponding one of the candidate central frequencies CFC1-CFC20 is close to or the same as the central frequency of the first light source 10. For example but not limited by, the second VLC device 250 may use the candidate central frequency CFC3 (30 MHz) to successfully decode the corresponding training packet 503.

After the second VLC device 250 successfully searches the candidate central frequency (for example, CFC3), the second VLC device 250 may return the training packet 503 to the first VLC device 200 (and optionally the ACK field of the training packet 503 from the second VLC device 250 may include the parameter indicating successful decoding).

By so, the first VLC device 200 may be informed that the second VLC device 250 have already successfully decoded by using the candidate central frequency CFC3 which is similar to the central frequency of the first light source 10.

The above central frequency search operation is a coarse search operation. In the following, the similar operations may be used for fine search for the central frequency so that the searched central frequency is more close to the real central frequency of the first light source 10.

However, in other possible embodiment of the application, the fine central frequency search operation may be skipped and thus the central frequency searched in the coarse central frequency search operation is used as the central frequency of the light source, which is still within the spirit of the application. That is, the fine central frequency search operation is optional.

For simplicity, it is assumed that after the operations of FIG. 5, the candidate central frequency CFC3 is found in the coarse central frequency search operation.

In the embodiment of the application, the fine search may be performed on a predetermined range (for example, ±5 MHz) of the candidate central frequency found in the coarse central frequency search operation. However, as described above, the fine central frequency search operation is optional in the embodiment of the application. Thus, in an embodiment of the application, based on the decoding result on the central frequency training packets, the first processing circuit 210 selects one among the candidate central frequencies CFC1-CFC20 as the central frequency of the first light source 10 (without performing the fine central frequency search).

But in another possible embodiment of the application, the fine search may be performed on a predetermined range (for example, ±5 MHz) of the candidate central frequency found in the coarse central frequency search operation.

Figures 6, 7:
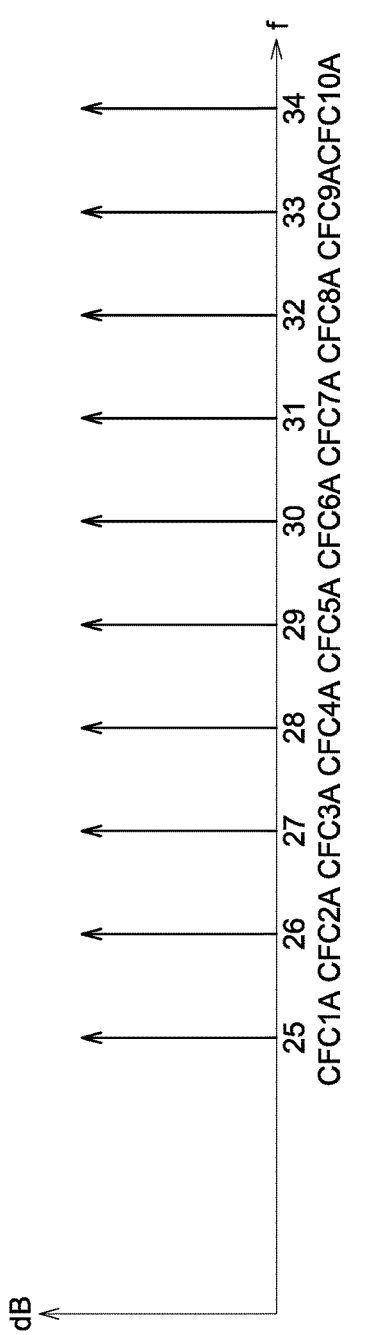
FIG. 6 shows 10 fine central frequencies according to an embodiment of the application.
FIG. 7 shows a flow of performing a fine central frequency search operation according to an embodiment of the application.

As shown in FIG. 6, in the predetermined range of the candidate central frequency CFC3, 10 fine candidate central frequencies CFC1A-CFC10A are defined. The 10 fine candidate central frequencies CFC1A-CFC10A are 25 MHz, 26 MHz, . . . 34 MHz and 35 MHz.

Referring to FIG. 7, FIG. 7 shows a flow of performing a fine central frequency search operation according to an embodiment of the application. In the fine central frequency search operation, the first VLC device 200 sends 10 training packets 710-710 and 10 blank packets, wherein each of the training packets 710-710 is followed by each of the 10 blank packets. The number of the training packets is related to the number of the fine candidate central frequencies.

The training packet 701 indicates that this packet 501 carries information about the fine candidate central frequency CFC1A and the default usable bandwidth (for example, 15 MHz). In other words, the FC field and the BW field of the training packet 701 carries information about the fine candidate central frequency CFC1A and the default usable bandwidth. The training packets 702-710 are similar.

In details, when the first VLC device 200 sends the training packet 701, the candidate central frequency CFC1A (25 MHz) and 15 MHz are as the central frequency and the usable bandwidth of the first VLC device 200, and so on.

At the timing T21, the first VLC device 200 sequentially sends the training packet 701, the (first) blank packet, the training packet 702, the (second) blank packet, . . . , the training packet 709, the (ninth) blank packet, the training packet 710 and the (tenth) blank packet; and the second VLC device 250 receives and decodes at the fine candidate central frequency CFC1A (25 MHz) and the default bandwidth (15 MHz).

At the timing T22, the first VLC device 200 sequentially sends the training packet 701, the (first) blank packet, the training packet 702, the (second) blank packet, . . . , the training packet 709, the (ninth) blank packet, the training packet 710 and the (tenth) blank packet; and the second VLC device 250 receives and decodes at the fine candidate central frequency CFC2A (26 MHz) and the default bandwidth (15 MHz).

Similarly, at the timing T30, the first VLC device 200 sequentially sends the training packet 701, the (first) blank packet, the training packet 702, the (second) blank packet, . . . , the training packet 709, the (ninth) blank packet, the training packet 710 and the (tenth) blank packet; and the second VLC device 250 receives and decodes at the fine candidate central frequency CFC10A (35 MHz) and the default bandwidth (15 MHz).

After decoding, the second VLC device 200 may be capable of successfully decoding the corresponding training packet by the corresponding one of the fine candidate central frequencies CFC1A-CFC10A. For example but not limited by, the second VLC device 250 may use the fine candidate central frequency CFC4A (28 MHz) to successfully decode the corresponding training packet 704.

After the second VLC device 250 successfully decodes by using the fine candidate central frequency (for example, CFC4A), the second VLC device 250 may return the training packet 704 to the first VLC device 200 (and optionally, the ACK field of the training packet 704 from the second VLC device 250 may include the parameter indicating successful decoding). By so, the first VLC device 200 may be informed that the second VLC device 250 have already successfully decoded by using the candidate central frequency CFC4A which is close to the central frequency of the first light source 10.

The first and the second VLC devices 200 and 250 may set the central frequency FC1 based on the searched fine candidate central frequency (for example, CFC4A). That is, in the above example, FC1=CFC4A.

If in need, the fine central frequency search operation may be repeated several times, and thus the searched candidate central frequency may be more close to the real central frequency of the first light source 10.

In searching the usable bandwidth of the light source, the operation is based on the found central frequency of the light source (FC1=CFC4A for example in the above example).

FIG. 8 to FIG. 21 show the operations for searching the usable bandwidth according to an embodiment of the application.

Figure 8:
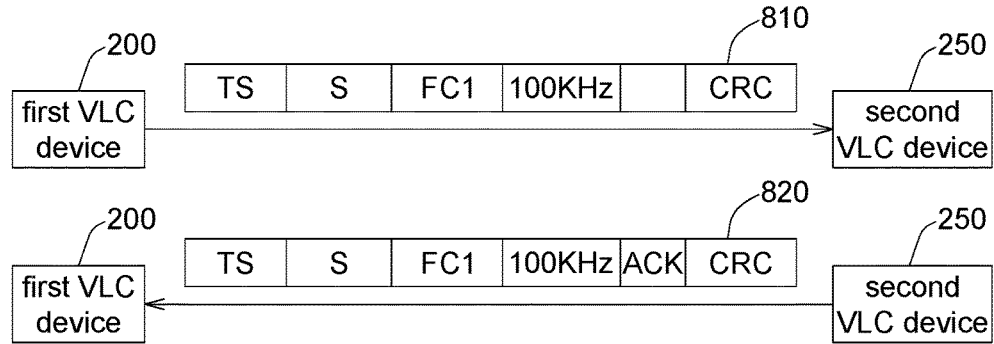
FIG. 8 to FIG. 21 show the operations for searching the usable bandwidth according to an embodiment of the application.

As shown in FIG. 8, in searching the usable bandwidth, the first VLC device 200 sends the training packet 810 to the second VLC device 250, wherein the FC field of the training packet 810 indicates the searched central frequency (FC1) and the BW field of the training packet 810 indicates 100 KHz. In the following, the training packet used in searching the usable bandwidth may be also referred as the bandwidth training packet, and the bandwidth indicated in the BW field of the bandwidth training packet may be also referred as the candidate bandwidth.

If the second VLC device 250 successfully decode the training packet 810, then the second VLC device 250 returns the training packet 820 to the first VLC device 200, wherein the ACK field of the training packet 820 includes ACK (that is, the decoding is successful). This means that the usable bandwidth of the first light source 10 is higher than the bandwidth 100 KHz of the training packet 810. In the following, the binary search is taken as an example in searching the usable bandwidth of the first light source 10. In the next round, the first VLC device 200 doubles the bandwidth as 200 KHz.

Figure 9:
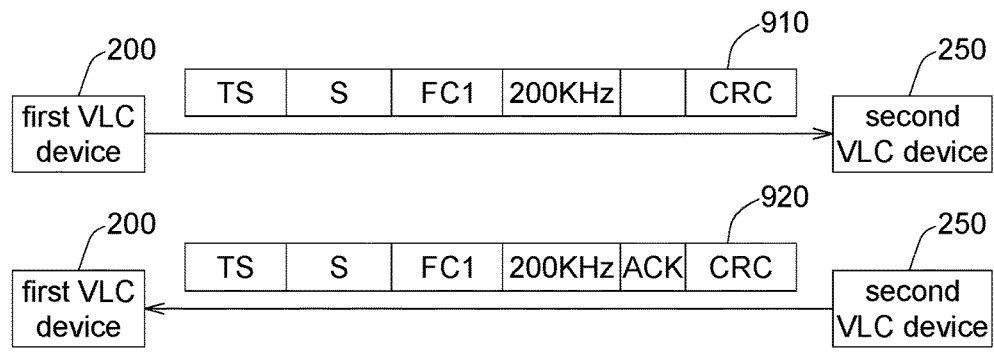

As shown in FIG. 9, the first VLC device 200 sends the training packet 910 to the second VLC device 250, wherein the FC field of the training packet 910 indicates the searched central frequency (FC1) and the BW field of the training packet 910 indicates 200 KHz.

If the second VLC device 250 successfully decode the training packet 910, then the second VLC device 250 returns the training packet 920 to the first VLC device 200, wherein the ACK field of the training packet 920 includes ACK (that is, the decoding is successful). This means that the usable bandwidth of the first light source 10 is higher than the bandwidth 200 KHz of the training packet 910. In the next round, the first VLC device 200 doubles the bandwidth as 400 KHz.

Figure 10:
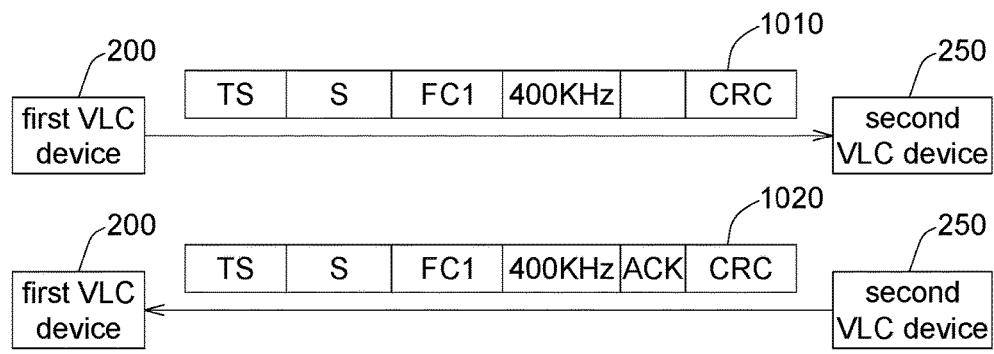

As shown in FIG. 10, the first VLC device 200 sends the training packet 1010 to the second VLC device 250, wherein the FC field of the training packet 1010 indicates the searched central frequency (FC1) and the BW field of the training packet 1010 indicates 400 KHz.

If the second VLC device 250 successfully decode the training packet 1010, then the second VLC device 250 returns the training packet 1020 to the first VLC device 200, wherein the ACK field of the training packet 1020 includes ACK (that is, the decoding is successful). This means that the usable bandwidth of the first light source 10 is higher than the bandwidth 400 KHz of the training packet 1010. In the next round, the first VLC device 200 doubles the bandwidth as 800 KHz.

Figure 11:
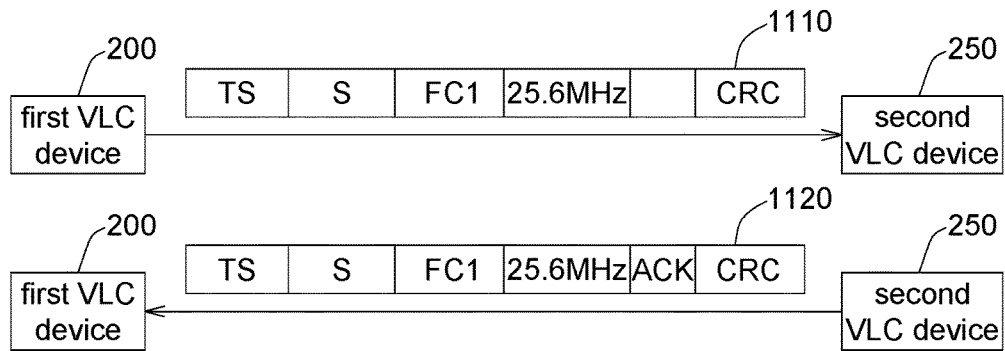

After several rounds (in which the bandwidth is 1.6 MHz, 3.2 MHz, 6.4 MHz and 12.8 MHz, respectively), as shown in FIG. 11, the first VLC device 200 sends the training packet 1110 to the second VLC device 250, wherein the FC field of the training packet 1110 indicates the searched central frequency (FC1) and the BW field of the training packet 1110 indicates 25.6 MHz.

If the second VLC device 250 successfully decode the training packet 1110, then the second VLC device 250 returns the training packet 1120 to the first VLC device 200, wherein the ACK field of the training packet 1120 includes ACK (that is, the decoding is successful). This means that the usable bandwidth of the first light source 10 is higher than the bandwidth 25.6 MHz of the training packet 1110. In the next round, the first VLC device 200 doubles the bandwidth as 51.2 MHz.

Figure 12:
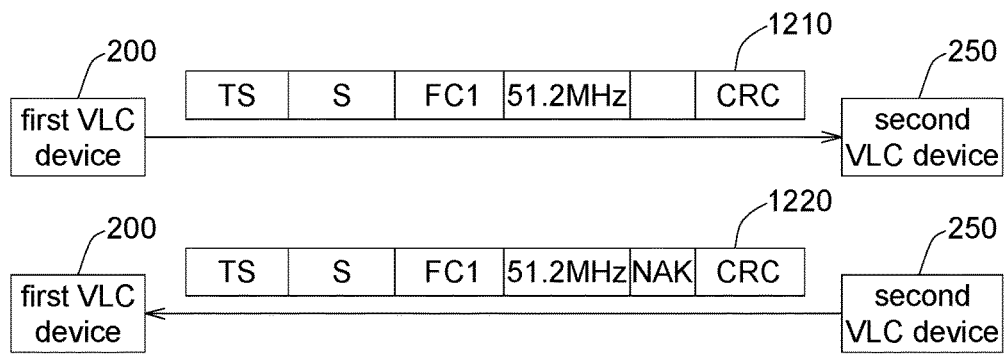

As shown in FIG. 12, the first VLC device 200 sends the training packet 1210 to the second VLC device 250, wherein the FC field of the training packet 1210 indicates the searched central frequency (FC1) and the BW field of the training packet 1210 indicates 51.2 MHz.

If the second VLC device 250 cannot successfully decode the training packet 1210, then the second VLC device 250 returns the training packet 1220 to the first VLC device 200, wherein the ACK field of the training packet 1220 includes NAK (that is, the decoding is failed). This means that the usable bandwidth of the first light source 10 is lower than 51.2 MHZ but higher than 25.6 MHz.

Thus, in the next round, the first VLC device 200 lowers the bandwidth. In binary search, the bandwidth of the next round may be set as (51.2+25.6)/2=38.4 MHz.

Figure 13:
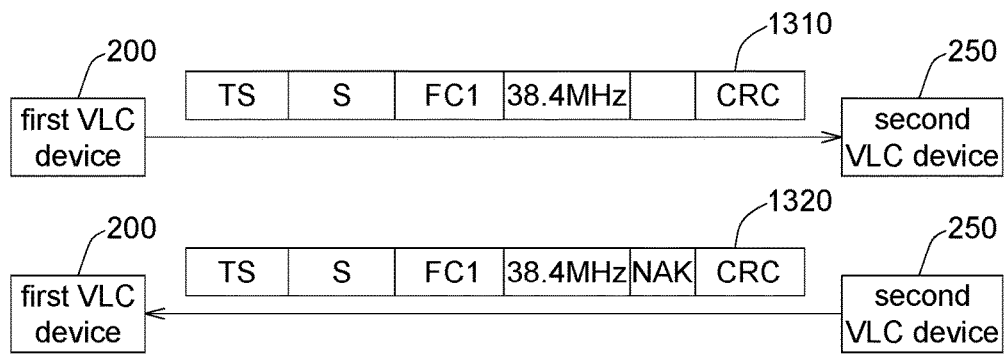

As shown in FIG. 13, the first VLC device 200 sends the training packet 1310 to the second VLC device 250, wherein the FC field of the training packet 1310 indicates the searched central frequency (FC1) and the BW field of the training packet 1310 indicates 38.4 MHz.

If the second VLC device 250 cannot successfully decode the training packet 1310, then the second VLC device 250 returns the training packet 1320 to the first VLC device 200, wherein the ACK field of the training packet 1320 includes NAK (that is, the decoding is failed). This means that the usable bandwidth of the first light source 10 is lower than 38.4 MHZ but higher than 25.6 MHz.

Thus, in the next round, the first VLC device 200 lowers the bandwidth. In binary search, the bandwidth of the next round may be set as (38.4+25.6)/2=32 MHz.

Figure 14:
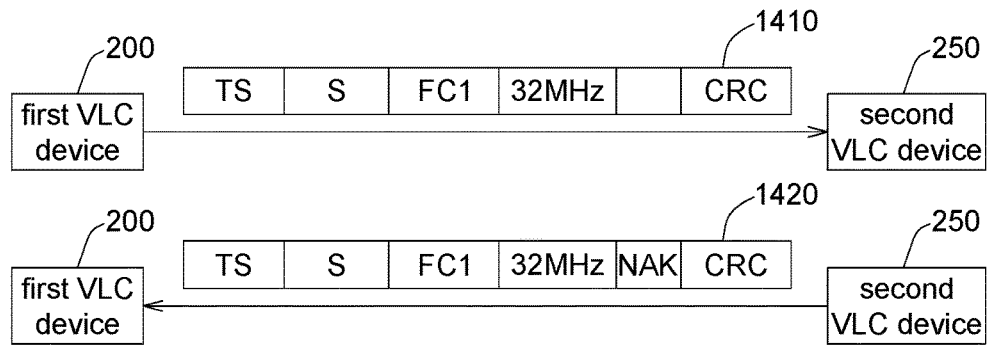

As shown in FIG. 14, the first VLC device 200 sends the training packet 1410 to the second VLC device 250, wherein the FC field of the training packet 1410 indicates the searched central frequency (FC1) and the BW field of the training packet 1210 indicates 32 MHz.

If the second VLC device 250 cannot successfully decode the training packet 1410, then the second VLC device 250 returns the training packet 1420 to the first VLC device 200, wherein the ACK field of the training packet 1420 includes NAK (that is, the decoding is failed). This means that the usable bandwidth of the first light source 10 is lower than 32 MHZ but higher than 25.6 MHz.

Thus, in the next round, the first VLC device 200 lowers the bandwidth. In binary search, the bandwidth of the next round may be set as (32+25.6)/2=28.8 MHz.

Figure 15:
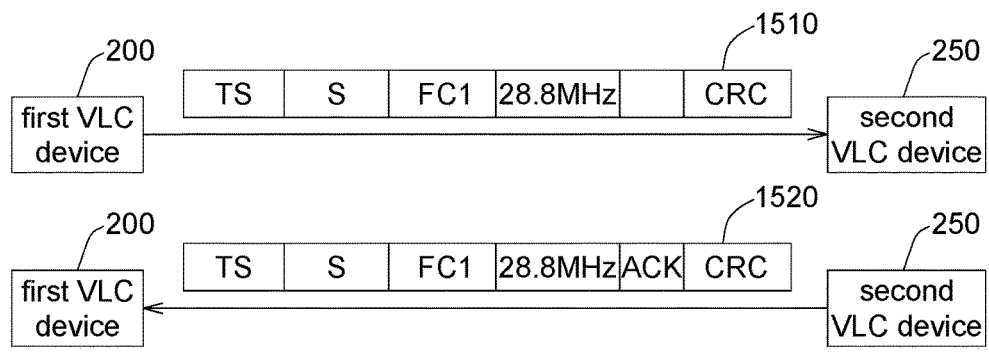

As shown in FIG. 15, the first VLC device 200 sends the training packet 1510 to the second VLC device 250, wherein the FC field of the training packet 1510 indicates the searched central frequency (FC1) and the BW field of the training packet 1510 indicates 28.8 MHz.

If the second VLC device 250 successfully decodes the training packet 1510, then the second VLC device 250 returns the training packet 1520 to the first VLC device 200, wherein the ACK field of the training packet 1520 includes ACK (that is, the decoding is successful). This means that the usable bandwidth of the first light source 10 is higher than 28.8 MHz but lower than 32 MHZ.

Thus, in the next round, the first VLC device 200 adjusts the bandwidth. In binary search, the bandwidth of the next round may be set as (32+28.8)/2=30.4 MHz.

Figure 16:
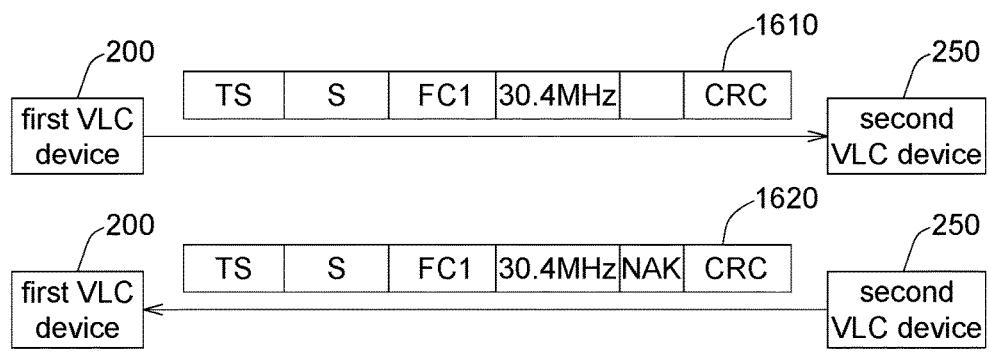

As shown in FIG. 16, the first VLC device 200 sends the training packet 1610 to the second VLC device 250, wherein the FC field of the training packet 1610 indicates the searched central frequency (FC1) and the BW field of the training packet 1610 indicates 30.4 MHz.

If the second VLC device 250 cannot successfully decode the training packet 1610, then the second VLC device 250 returns the training packet 1620 to the first VLC device 200, wherein the ACK field of the training packet 1620 includes NAK (that is, the decoding is failed). This means that the usable bandwidth of the first light source 10 is lower than 30.4 MHZ but higher than 28.8 MHz.

Thus, in the next round, the first VLC device 200 adjusts the bandwidth. In binary search, the bandwidth of the next round may be set as (30.4+28.8)/2=29.6 MHz.

Figure 17:
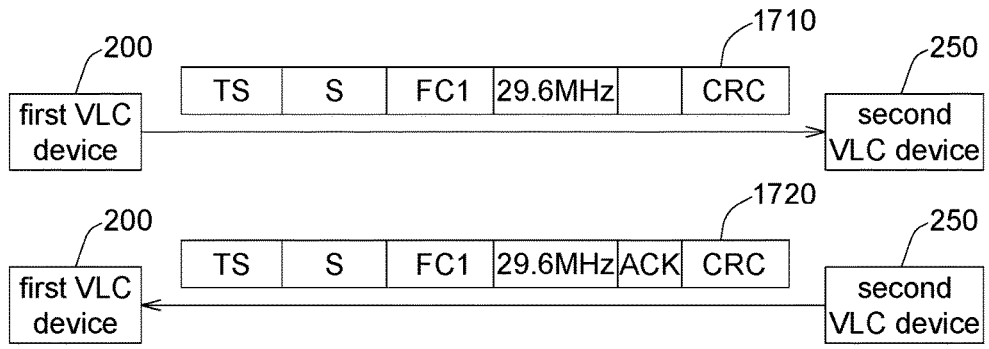

As shown in FIG. 17, the first VLC device 200 sends the training packet 1710 to the second VLC device 250, wherein the FC field of the training packet 1710 indicates the searched central frequency (FC1) and the BW field of the training packet 1710 indicates 29.6 MHz.

If the second VLC device 250 successfully decodes the training packet 1710, then the second VLC device 250 returns the training packet 1720 to the first VLC device 200, wherein the ACK field of the training packet 1720 includes ACK (that is, the decoding is successful). This means that the usable bandwidth of the first light source 10 is higher than 29.6 MHz but lower than 30.4 MHz.

Thus, in the next round, the first VLC device 200 adjusts the bandwidth. In binary search, the bandwidth of the next round may be set as (30.4+29.6)/2=30 MHz.

Figure 18:
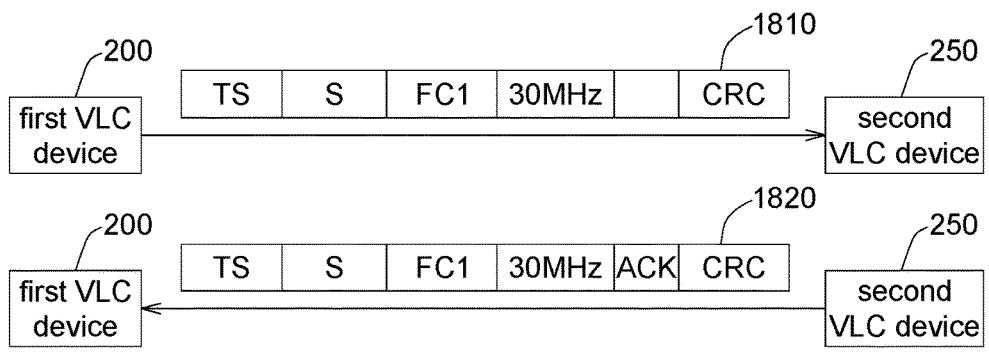

As shown in FIG. 18, the first VLC device 200 sends the training packet 1810 to the second VLC device 250, wherein the FC field of the training packet 1810 indicates the searched central frequency (FC1) and the BW field of the training packet 1810 indicates 30 MHz.

If the second VLC device 250 successfully decodes the training packet 1810, then the second VLC device 250 returns the training packet 1820 to the first VLC device 200, wherein the ACK field of the training packet 1820 includes ACK (that is, the decoding is successful). This means that the usable bandwidth of the first light source 10 is higher than 30 MHz but lower than 30.4 MHz.

Thus, in the next round, the first VLC device 200 adjusts the bandwidth. In binary search, the bandwidth of the next round may be set as (30.4+30)/2=30.2 MHz.

Figure 19:
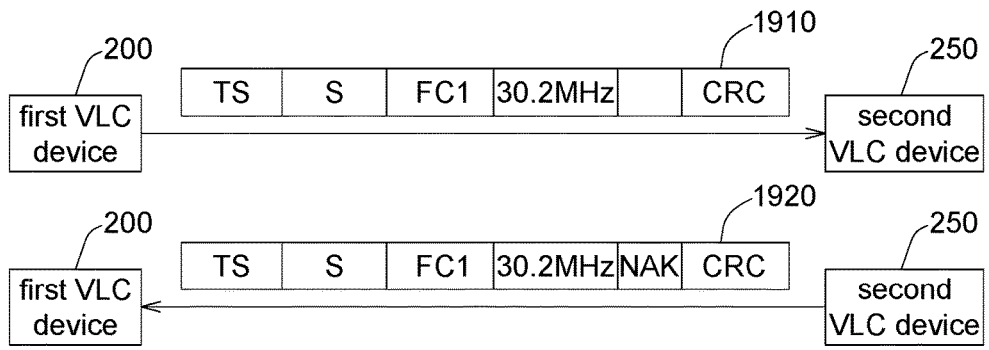

As shown in FIG. 19, the first VLC device 200 sends the training packet 1910 to the second VLC device 250, wherein the FC field of the training packet 1910 indicates the searched central frequency (FC1) and the BW field of the training packet 1910 indicates 30.2 MHz.

If the second VLC device 250 cannot successfully decode the training packet 1910, then the second VLC device 250 returns the training packet 1920 to the first VLC device 200, wherein the ACK field of the training packet 1920 includes NAK (that is, the decoding is failed). This means that the usable bandwidth of the first light source 10 is higher than 30 MHz but lower than 30.2 MHz.

Thus, in the next round, the first VLC device 200 adjusts the bandwidth. In binary search, the bandwidth of the next round may be set as (30.2+30)/2=30.1 MHz.

Figure 20:
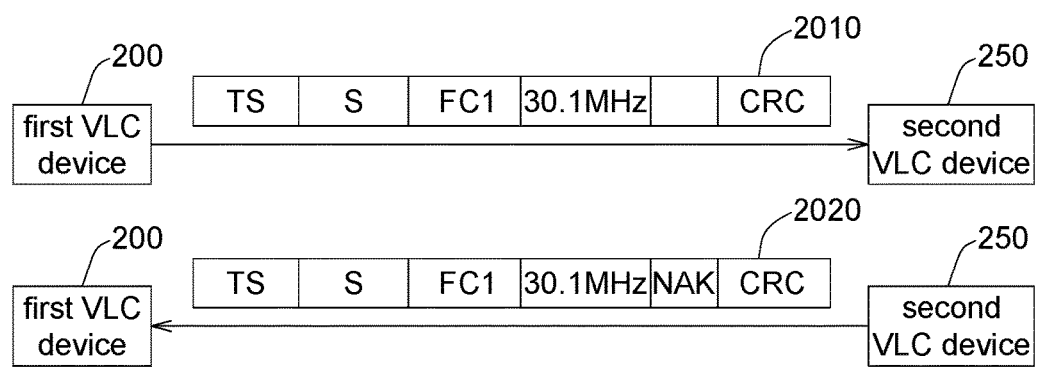

As shown in FIG. 20, the first VLC device 200 sends the training packet 2010 to the second VLC device 250, wherein the FC field of the training packet 2010 indicates the searched central frequency (FC1) and the BW field of the training packet 2010 indicates 30.1 MHz.

If the second VLC device 250 cannot successfully decode the training packet 2010, then the second VLC device 250 returns the training packet 2020 to the first VLC device 200, wherein the ACK field of the training packet 2020 includes NAK (that is, the decoding is failed). This means that the usable bandwidth of the first light source 10 is higher than 30 MHz but lower than 30.1 MHz. Thus, the first VLC device 200 decides the bandwidth of the first light source 10 as 30 MHz.

Figure 21:
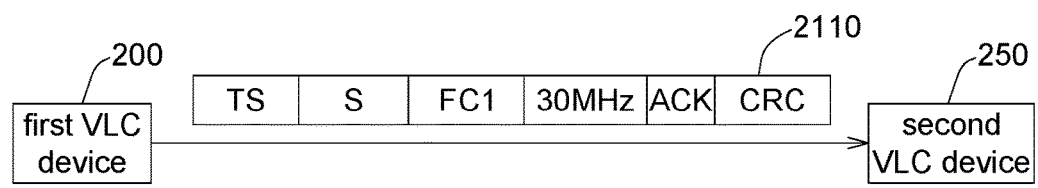

In FIG. 21, the first VLC device 200 informs the second VLC device 250 by sending the packet 2110 to the second VLC device 250, wherein the FC field of the packet 2110 indicates the searched central frequency (FC1) and the BW field of the packet 2110 indicates 30 MHz, and the ACK field of the packet 2110 includes ACK. After the second VLC device 250 receives the packet 2110, the second VLC device 250 decides that the bandwidth of the first light source 10 as 30 MHz and sets the clock signal CLK1 of the second VLC device 250 accordingly.

In determining the central frequency and the usable bandwidth of the uplink VLC, the operations are similar and thus are omitted.

Figure 22:
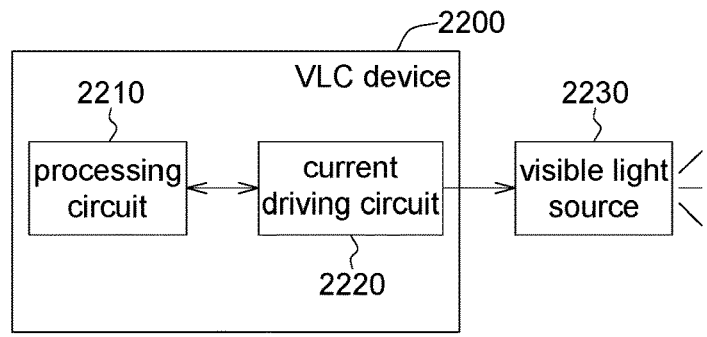
FIG. 22 shows a functional block diagram of a visible light communication (VLC) device according to an embodiment of the application.

FIG. 22 shows a functional block diagram of a visible light communication (VLC) device 2200 according to an embodiment of the application. The VLC device 2200 performs VLC by the visible light source 2230. The VLC device 2200 includes the processing circuit 2210 and the current driving circuit 2220 coupled to the processing circuit 2210 and the visible light source 2230. The current driving circuit 2220 is controlled by the processing circuit 2210 to drive the visible light source 2230. When the processing circuit 2210 searches the central frequency of the visible light source 2230, the processing circuit 2210 sends a plurality of central frequency training packets to the current driving circuit 2220 (wherein the central frequency training packets includes a plurality of candidate central frequencies), and based on a first decoding result on the central frequency training packets, the processing circuit 2210 selects one among the candidate central frequencies as the central frequency of the visible light source 2230. In searching the bandwidth of the visible light source 2230, the processing circuit 2210 sends a plurality of bandwidth training packets to the current driving circuit 2220 (wherein the bandwidth training packets includes a plurality of candidate bandwidth), and based on a second decoding result on the bandwidth training packets, the processing circuit 2210 selects one among the candidate bandwidth as the bandwidth of the visible light source 2230.

Figure 23:
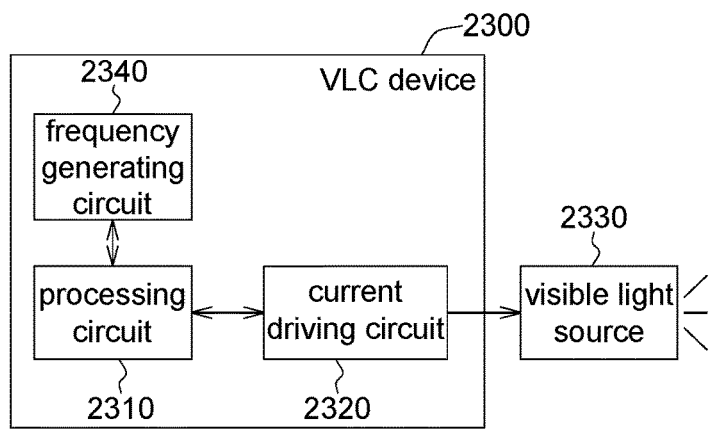
FIG. 23 shows a functional block diagram of a visible light communication (VLC) device according to an embodiment of the application.

FIG. 23 shows a functional block diagram of a visible light communication (VLC) device 2300 according to an embodiment of the application. The VLC device 2300 performs VLC by the visible light source 2330. The VLC device 2300 includes the processing circuit 2310, the current driving circuit 2320 and the frequency generating circuit 2340. The frequency generating circuit 2340 is coupled to processing circuit 2310. The operations of the processing circuit 2310 and the current driving circuit 2320 are similar and thus omitted here. The candidate central frequencies (for example, CFC1-CFC20 in FIG. 4 or CFC1A-CFC10A of FIG. 6) are generated by the frequency generating circuit 2340 and sent to the processing circuit 2310. However, in other possible embodiment of the application, the candidate central frequencies (for example, CFC1-CFC20 in FIG. 4 or CFC1A-CFC10A of FIG. 6) are generated by the first processing circuit 210 and/or the second processing circuit 260 of FIG. 2, which is still within the spirit and scope of the application. That is, in the embodiment of the application, the candidate central frequencies may be generated by hardware implementation, by software implementation or by firmware implementation.

Figure 24:
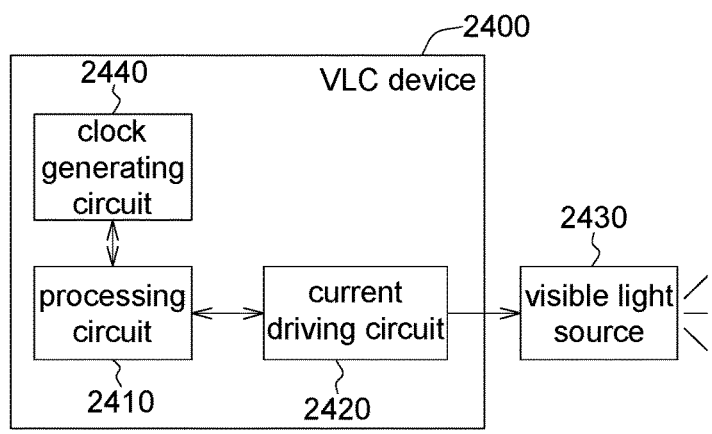
FIG. 24 shows a functional block diagram of a visible light communication (VLC) device according to an embodiment of the application.

FIG. 24 shows a functional block diagram of a visible light communication (VLC) device 2400 according to an embodiment of the application. The VLC device 2400 performs VLC by the visible light source 2430. The VLC device 2400 includes the processing circuit 2410, the current driving circuit 2420 and the clock generating circuit 2440. The clock generating circuit 2440 is coupled to processing circuit 2410. The operations of the processing circuit 2410 and the current driving circuit 2420 are similar and thus omitted here. The candidate bandwidth (for example, 100 KHz of FIG. 8, 200 KHz of FIG. 9) indicated in the BW field of the bandwidth training packet is generated by the clock generating circuit 2440 and sent to the processing circuit 2410. However, in other possible embodiment of the application, the candidate bandwidth (for example, 100 KHz of FIG. 8, 200 KHz of FIG. 9) indicated in the BW field of the bandwidth training packet is generated by the first processing circuit 210 and/or the second processing circuit 260 of FIG. 2, which is still within the spirit and scope of the application. That is, in the embodiment of the application, the candidate bandwidth may be generated by hardware implementation, by software implementation or by firmware implementation.

Figure 25:
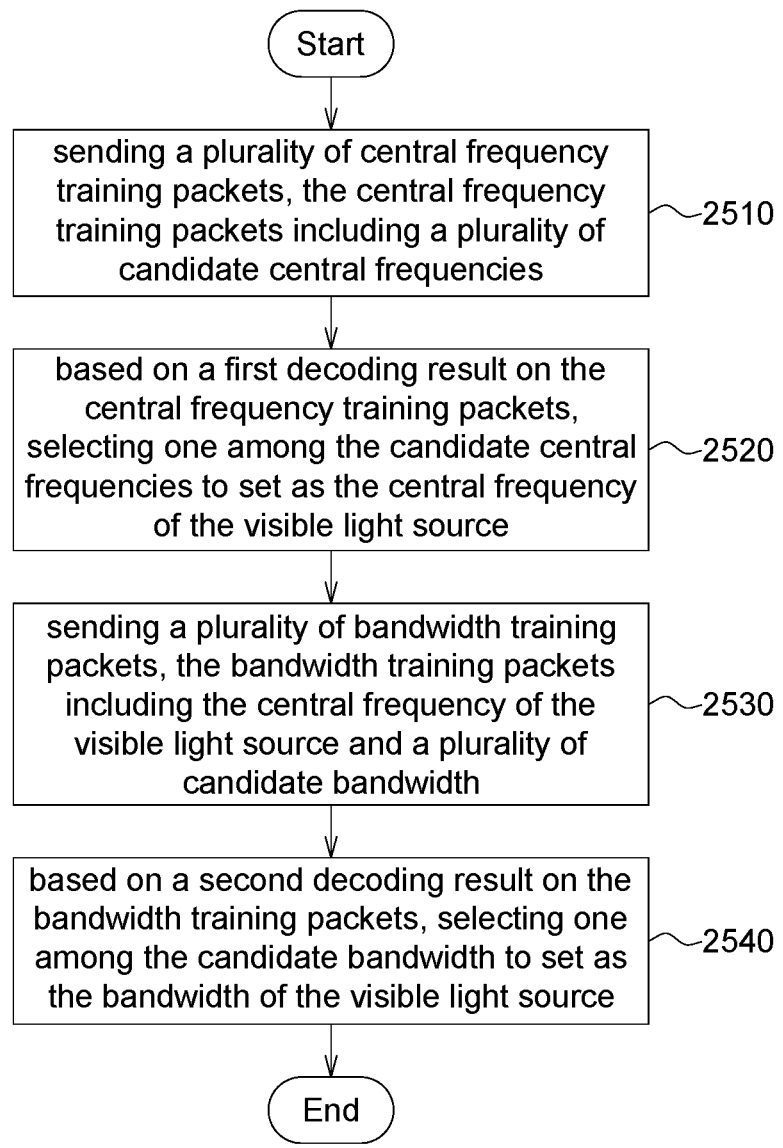
FIG. 25 shows flows of a visible light communication (VLC) method according to an embodiment of the application.

FIG. 25 shows flows of a visible light communication (VLC) method according to an embodiment of the application. The VLC method includes: in searching a central frequency of the visible light source, sending a plurality of central frequency training packets, the central frequency training packets including a plurality of candidate central frequencies (2510); and based on a first decoding result on the central frequency training packets, selecting one among the candidate central frequencies to set as the central frequency of the visible light source (2520). The VLC method further includes in searching a bandwidth of the visible light source, sending a plurality of bandwidth training packets, the bandwidth training packets including the central frequency of the visible light source and a plurality of candidate bandwidth (2530); and based on a second decoding result on the bandwidth training packets, selecting one among the candidate bandwidth to set as the bandwidth of the visible light source (2540).

As described above, the embodiments of the application may quickly and accurately search the central frequency and the usable bandwidth of the visible light source.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A visible light communication (VLC) device for performing VLC by a visible light source, the VLC device comprising:
a processing circuit; and
a current driving circuit, coupled to the processing circuit and the visible light source, wherein the current driving circuit being controlled by the processing circuit to drive the visible light source,
wherein
in searching a central frequency of the visible light source, the processing circuit is configured to:
send a plurality of central frequency training packets to the current driving circuit, the central frequency training packets including a plurality of candidate central frequencies; and
based on a first decoding result on the central frequency training packets, select one among the candidate central frequencies to set as the central frequency of the visible light source; and
in searching a bandwidth of the visible light source, the processing circuit is configured to:
send a plurality of bandwidth training packets to the current driving circuit, the bandwidth training packets including the central frequency of the visible light source and a plurality of candidate bandwidth; and
based on a second decoding result on the bandwidth training packets, select one among the candidate bandwidth to set as the bandwidth of the visible light source.

2. The VLC device according to claim 1, wherein in searching the central frequency of the visible light source, the processing circuit is configured to:
sequentially send the central frequency training packets and a plurality of blank packets, each of the blank packets inserted between two of the central frequency training packets; and
when one of the central frequency training packets is successfully decoded by a first candidate central frequency of the candidate central frequencies, set the first candidate central frequency as the central frequency of the visible light source.

3. The VLC device according to claim 1, wherein in searching the central frequency of the visible light source, the processing circuit is configured to:
in a first central frequency search operation,
sequentially send a plurality of first central frequency training packets and a plurality of blank packets, each of the blank packets inserted between two of the first central frequency training packets, the first central frequency training packets including a plurality of first candidate central frequencies; and
when one of the first central frequency training packets is successfully decoded by a candidate central frequency of the first candidate central frequencies, select the candidate central frequency of the first candidate central frequencies;
in a second central frequency search operation,
sequentially send a plurality of second central frequency training packets and the blank packets, each of the blank packets inserted between two of the second central frequency training packets, the second central frequency training packets including a plurality of second candidate central frequencies, the second candidate central frequencies being determined based on the selected candidate central frequency of the first candidate central frequencies; and
when one of the second central frequency training packets is successfully decoded by a candidate central frequency of the second candidate central frequencies, set the candidate central frequency of the second candidate central frequencies as the central frequency of the visible light source.

4. The VLC device according to claim 1, wherein in searching the bandwidth of the visible light source, the processing circuit is configured to:
send a first bandwidth training packet which includes a first candidate bandwidth and the central frequency of the visible light source;
based on a decoding result on the first bandwidth training packet, increase or decrease the first candidate bandwidth into a second candidate bandwidth and send a second bandwidth training packet which includes the second candidate bandwidth and the central frequency of the visible light source; and
repeat the above two steps until the bandwidth of the visible light source is found.

5. The VLC device according to claim 1, further comprising:
a peak detector, coupled to the processing circuit, for detecting a VLC signal and return a detection result to the processing circuit.

6. The VLC device according to claim 1, further comprising:
a frequency generating circuit, coupled to the processing circuit, for generating the candidate central frequencies and sending to the processing circuit.

7. The VLC device according to claim 1, wherein:
the processing circuit generates the candidate central frequencies.

8. The VLC device according to claim 1, further comprising:
a clock generating circuit, coupled to the processing circuit, for generating the candidate bandwidth and sending to the processing circuit.

9. The VLC device according to claim 1, wherein:
the processing circuit generates the candidate bandwidth.

10. A visible light communication (VLC) method for performing VLC by a visible light source, the VLC method comprising:
- in searching a central frequency of the visible light source:
  - sending a plurality of central frequency training packets, the central frequency training packets including a plurality of candidate central frequencies; and
  - based on a first decoding result on the central frequency training packets, selecting one among the candidate central frequencies to set as the central frequency of the visible light source; and
- in searching a bandwidth of the visible light source:
  - sending a plurality of bandwidth training packets, the bandwidth training packets including the central frequency of the visible light source and a plurality of candidate bandwidth; and
  - based on a second decoding result on the bandwidth training packets, selecting one among the candidate bandwidth to set as the bandwidth of the visible light source.

11. The VLC method according to claim 10, wherein the step of searching the central frequency of the visible light source comprises:
- sequentially sending the central frequency training packets and a plurality of blank packets, each of the blank packets inserted between two of the central frequency training packets; and
- when one of the central frequency training packets is successfully decoded by a first candidate central frequency of the candidate central frequencies, setting the first candidate central frequency as the central frequency of the visible light source.

12. The VLC method according to claim 10, wherein the step of searching the central frequency of the visible light source comprises:
- a first central frequency search step comprising:
- sequentially sending a plurality of first central frequency training packets and a plurality of blank packets, each of the blank packets inserted between two of the first central frequency training packets, the first central frequency training packets including a plurality of first candidate central frequencies; and
- when one of the first central frequency training packets is successfully decoded by a candidate central frequency of the first candidate central frequencies, selecting the candidate central frequency of the first candidate central frequencies;
- a second central frequency search step comprising:
- sequentially sending a plurality of second central frequency training packets and the blank packets, each of the blank packets inserted between two of the second central frequency training packets, the second central frequency training packets including a plurality of second candidate central frequencies, the second candidate central frequencies being determined based on the selected candidate central frequency of the first candidate central frequencies; and
- when one of the second central frequency training packets is successfully decoded by a candidate central frequency of the second candidate central frequencies, setting the candidate central frequency of the second candidate central frequencies as the central frequency of the visible light source.

13. The VLC method according to claim 10, wherein the step of searching the bandwidth of the visible light source comprises:
- sending a first bandwidth training packet which includes a first candidate bandwidth and the central frequency of the visible light source;
- based on a decoding result on the first bandwidth training packet, increasing or decreasing the first candidate bandwidth into a second candidate bandwidth and sending a second bandwidth training packet which includes the second candidate bandwidth and the central frequency of the visible light source.

14. A visible light communication (VLC) system comprising:
- a first VLC device; and
- a second VLC device, VLC between the first and the second VLC device being using a visible light source, wherein
- in searching a central frequency of the visible light source,
  - the first VLC device sends a plurality of central frequency training packets to the second VLC device, the central frequency training packets including a plurality of candidate central frequencies; and
  - based on a first decoding result on the central frequency training packets from the second VLC device, the first VLC device selects one among the candidate central frequencies to set as the central frequency of the visible light source; and
- in searching a bandwidth of the visible light source,
  - the first VLC device sends a plurality of bandwidth training packets to the second VLC device, the bandwidth training packets including the central frequency of the visible light source and a plurality of candidate bandwidth; and
  - based on a second decoding result on the bandwidth training packets from the second VLC device, the first VLC device selects one among the candidate bandwidth to set as the bandwidth of the visible light source.

* * * * *